United States Patent Office 3,384,608
Patented May 21, 1968

3,384,608
VINYL CHLORIDE RESINS AND PLASTICIZ-
ERS THEREFOR STABILIZED WITH 1,1-BIS
(2 - METHYL - 5 - TERTIARY BUTYL - 4 - HY-
DROXYPHENYL) BUTANE
George F. Hardy and Ronald Saltzman, Madison, N.J.,
assignors to Allied Chemical Corporation, New York,
N.Y., a corporation of New York
No Drawing. Filed Aug. 7, 1964, Ser. No. 388,305
4 Claims. (Cl. 260—31.8)

This invention relates to stabilized ester plasticizers and to vinyl resin compositions of improved electrical resistance characteristics containing such stabilized esters.

Organic esters of dicarboxylic acids useful as plasticizers for polyvinyl chloride resin compositions are well known. In the preparation of plasticized polyvinyl chloride insulating compositions, phthalic esters of $C_6$ to $C_{14}$ chain alcohols are especially useful. These include di-2-ethylhexyl phthalate, diisodecyl phthalate, dioctyl phthalate, diisooctyl phthalate, ditridecyl phthalate, etc. A primary utility of such plasticizers is in blending with polyvinyl chloride for the production of wire insulating compositions. Such compositions are applied as coatings around the wires, usually by extruding the softened coating composition around an advancing core of wire at elevated temperatures of about 150° C.

One of the most valued characteristics of a wire coating besides its mechanical effectiveness is the electrical resistance of the composition, and improvement of this characteristic is an object of continuing effort by suppliers and user of such coatings. Electrical resistance of a coating may be evaluated as volume resistivity by the standard ASTM Test Method D-257-58 from measurements of volume resistance of the coating.

Especially suitable as plasticizers in the preparation of polyvinyl chloride insulating compositions are phthalic acid esters prepared from branched chain alcohols obtained by the so called "oxo" process wherein an olefin feed is reacted with carbon monoxide and hydrogen at temperatures between about 250° F. and 400° F. and pressures of about 150 to 400 atmospheres in the presence of suitable catalysts, and the aldehydes so formed are hydrogenated to form alcohols. Such "oxo" alcohols are in the $C_6$–$C_{14}$ range and these alcohols, especially those in the $C_8$–$C_{10}$ range, are especially useful in forming esters such as the phthalic esters, for use as plasticizers in insulating plastics and resins.

In spite of the desirable properties and mechanical effectiveness of the polyvinyl chloride resins plasticized with such ester plasticizers, their utility in insulating compositions has been limited by the instability of the plasticizers during storage and prolonged aging and in their end uses combined with polyvinyl chloride resins in electrical insulating applications.

An object of the present invention is to provide phthalic acid diesters of $C_6$–$C_{14}$ alcohols, including the branched chain "oxo" alcohols, having a high degree of stability against oxidative degradation on prolonged storage.

Another object of the invention is to provide polyvinyl chloride resin compositions plasticized with $C_6$–$C_{14}$ diesters of phthalic acid having improved electrical resistance properties.

These and other objects are accomplished according to our invention wherein the stability of the phthalic acid ester plasticizer is prolonged, and the volume resistivities of polyvinyl chloride resin compositions plasticized therewith are enhanced by the addition to said plasticizer ester of small quantities of 1, 1-bis-(2-methyl-5-tertiarybutyl-4-hydroxyphenyl) butane of the formula:

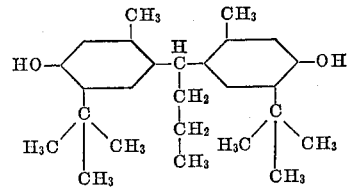

The above compound, sometimes called 4,4'-butylidene bis-(6-tert-butyl-m-cresol), is a white solid obtainable commercially in powdered form.

In preparing the stabilized plasticizer esters and resulting stabilized vinyl resin compositions of our invention, small amounts, for example between about 0.05 part and about 0.20 part by weight of the solid 1,1-bis-(2-methyl-5-tertiary butyl-4-hydroxyphenyl) butane are mixed with 100 parts of the liquid plasticizer in any suitable manner, as in an agitated blending tank and stirred until the stabilizer dissolves in the plasticizer.

The plasticized vinyl resin compositions may be prepared in conventional manner as by dry blending resin, plasticizer and filler components and milling the mixture on a heated roller mill or in a dough mixer until the components are thoroughly blended.

Plasticizers which are adapted for stabilization according to our invention are the straight chain and branched chain $C_6$–$C_{14}$ alkyl and cycloalkyl esters of phthalic acid and especially the $C_8$–$C_{10}$ alkyl and cycloalkyl esters, including dioctyl phthalate, diisooctyl phthalate, diisodecyl phthalate, di-2-ethylhexyl phthalate, ditridecyl phthalate, and dicyclohexyl phthalate.

Addition to the above plasticizers of the small proportions of 1,1-bis-(2-methyl-5-tertiary butyl-4-hydroxyphenyl) butane indicated, fully stabilizes the plasticizer for substantial storage periods and, when the stabilized plasticizer is blended with polyvinyl chloride resins, provides compositions not only of improved stability, but of greatly enhanced volume resistivity as compared to similar compositions containing no stabilizer.

While 1,1-bis-(2-methyl-5-tertiary butyl - 4-hydroxyphenyl) butane may be used as the sole stabilizer in the compositions of our invention, we find that the addition to the stabilized plasticizer of between about 0.2 part and about 0.5 part per 100 parts of plasticizer by weight, of a phosphite ester such as triphenyl phosphite or a diphenyl, mono-alkyl phosphite, further improves the volume resistivity of polyvinyl chloride resin compositions containing these plasticizers, often by as much as 50% to 100%. Other conventional additives may also be included.

The phosphite esters suitable for combination with 1,1-bis-(2-methyl-5-tertiary butyl-4-hydroxyphenyl) butane in our stabilizer system have the formula shown below:

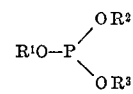

wherein $R^1$ is a member selected from the group consisting of hydrogen, alkyl radicals of 1–10 carbon atoms the phenyl radical, and 1–10 carbon atom alkyl-substituted phenyl radicals, $R^2$ and $R^3$ are members selected from the group consisting of alkyl radicals of 1–10 carbon atoms, the phenyl radical and 1–10 carbon atom alkyl-substituted phenyl radicals. Particularly effective are: triphenyl phosphite; tris (nonylphenyl) phosphite; 2-ethylhexyl, octyl phenylphosphite; tris (2 ethylhexyl) phosphite; and di (2-ethylhexyl)-hydrogen phosphite.

The stabilized esters of our invention are particularly useful in vinyl resin formulations which employ calcium carbonate as a portion or all of the filler content since such compositions are not susceptible of adequate stabilization by many of the prior art stabilization systems.

Plasticizer proportions used in compounding electrically resistive compositions are those conventionally employed for this purpose and, in the case of polyvinyl chloride resin compositions, usually range between about 50 parts and about 100 parts of stabilized plasticizer per 100 parts of polyvinyl chloride resin by weight. Conventional fillers may also be employed, as well as other common additives such as lubricants, additional stabilizers, etc.

By the term vinyl chloride resin is meant vinyl chloride polymers and vinyl chloride copolymers wherein the vinyl chloride is copolymerized with other ethylenically unsaturated compounds, the said copolymers containing a major proportion by weight of vinyl chloride. Ethylenically unsaturated compounds which can be copolymerized with vinyl chloride include the vinylidene halides such as vinylidene chloride and vinylidene bromide; vinyl esters such as vinyl acetate, vinyl propionate, etc.; acrylic acid, alpha alkyl acrylic acids, their alkyl esters, etc.

The following specific examples further illustrate our invention. Parts and percentages are by weight except as otherwise noted.

EXAMPLES 1 AND 2

Oxygen absorption rates were measured of two samples of diisodecyl phthalate containing in Example 1, 0.1% of 1,1-bis-(2-methyl-5-tertiary butyl-4-hydroxy-phenyl) butane and in Example 2, 0.1% of 1,1-bis-(2-methyl-5-tertiary butyl-4-hydroxy-phenyl) butane and 0.2% of triphenyl phosphite.

In carrying out the tests, a five ml. sample (4.5 grams) of the stabilizer-containing diisodecyl phthalate was placed at the bottom of a 50 ml. volumetric flask, providing a depth of plasticizer of 0.5 cm. A small glass wool plug was placed at the bottom of the neck of the flask, and the remainder of the neck was filled with "Molecular Sieve," type 5A pellets, i.e. calcium zeolite pellets, pore size about 5 Angstroms. The top of the neck was connected to a U-tube and the flask was evacuated to 1 mm. Hg and then filled with "dry" nitrogen. This evacuation and nitrogen filling was repeated three times. Then the flask was lowered into a 151° C. silicone oil bath, and was allowed to remain therein for 4.5 minutes to equilibrate temperature of gas inside the flask with that of the bath. The flask was then evacuated to 1 mm. Hg for 0.5 minute, then filled with "USP" oxygen. After one minute (zero time being taken at the moment the oxygen was admitted) the apparatus was sealed off. Then the volume of oxygen absorbed was measured periodically by leveling mercury in both arms of the U-tube and noting the height of mercury column in the arm attached to the flask. Measurements were taken for three hours. A blank with no ester gave no detectable oxygen absorption. Results are shown in Table I below.

Table I

EFFECT OF STABILIZERS ON RATE OF OXIDATION OF DIISODECYL PHTHALATE

| Stabilizer | Oxygen obsorption rate, $10^3 \times$ cc./g./min. |
|---|---|
| None | 492 |
| Ex. 1, 1,1-bis- 2-methyl-5-tertiary butyl-4-hydroxyphenyl) butane (0.1%) | 3.0 |
| Ex. 2, 1,1-bis - (2-methyl-5-tertiary butyl-4-hydroxyphenyl) butane and triphenyl phosphite (0.2%) | 1.3 |
| Bisphenol A (ca. .25%) | 5.2 |

EXAMPLES 3-6

Four standard vinyl resin formulations of the compositions given below were prepared.

| | Parts by weight |
|---|---|
| Polyvinyl chloride | 100 |
| Plasticizer+stabilizer | 60 |
| Clay | 21 |
| Calcium carbonate | 15 |
| Lead silicate/sulfate | 5 |
| Stearic acid | 0.25 |

In each formulation, the plasticizer was diisodecyl phthalate modified by the addition of stabilizer listed below.

| Example No.: | Stabilizer |
|---|---|
| 3 | 0.2% 1,1-bis-(2-methyl-5-tertiary-butyl-4-hydroxyphenyl) butane. |
| 4 | 0.05% 1,1-bis-(2-methyl-5-tertiary-butyl-4-hydroxyphenyl) butane. |
| 5 | 0.05% 1,1-bis-(2-methyl-5-tertiary-butyl-4-hydroxyphenyl) butane, 0.25% triphenyl phosphite. |
| 6 | 0.05% 1,1-bis-(2-methyl-5-tertiary-butyl-4-hydroxyphenyl) butane, 0.5% triphenyl phosphite. |
| Control A | No added stabilizer. |
| Control B | 0.2% Bisphenol A. |

The separate formulations were dry blended and milled on a standard two roll mill at about 300° F. and were sheeted off at thicknesses of 20–25 mils. Specimens were cut and subjected to volume resistivity determinations at 70° C. using 500 volts for one minute according to ASTM Test Method D–257–58. Three specimens of each sample were measured. Results are shown in Table II below.

| Example No.: | Compound volume resistivity, ohm-cm. $\times 10^{12}$ |
|---|---|
| 3 | 77 |
| 4 | 55 |
| 5 | 96 |
| 6 | 122 |
| Control B (0.2% Bisphenol A) | 2.7 |

While the above describes the preferred embodiments of our invention, it will be understood that departures can be made therefrom within the scope of the specification and claims.

We claim:

1. A plasticizer composition stable against oxidative degradation which comprises diisodecyl phthalate prepared from "oxo" prepared alcohol having dissolved therein the combination of between about 0.05% to 0.2% by weight of 1,1-bis(2-methyl - 5 - tertiary butyl - 4 - hydroxyphenyl) butane and between about 0.2% to 0.5% by weight of an organic phosphite of the formula:

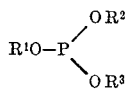

wherein $R^1$ is a member selected from the group consisting of hydrogen, the phenyl radical, 1–10 carbon atom alkyl substituted phenyl radicals, and alkyl radicals of 1–10 carbon atoms, $R^2$ and $R^3$ are selected from the group consisting of the phenyl radical, 1–10 carbon atoms substituted phenyl radicals, and alkyl radicals of 1–10 carbon atoms.

2. The plasticizer composition of claim 1 in which the organic phosphite is triphenyl phosphite.

3. A wire coating composition of high volume resistivity comprising: (A) a vinyl chloride polymer selected from the group of polyvinyl chloride and copolymers of a major portion of vinyl chloride with a minor portion of a monoethylenically unsaturated monomer copolymerizable with vinyl chloride; (B) calcium carbonate as filler; (C) diisodecyl phthalate prepared from "oxo" prepared alcohol; and (D) between about 0.05% to 0.2% by weight of 1,1-bis(2-methyl-5-tertiary butyl-4-hydroxyphenyl) butane and between about 0.2% to 0.5% by weight of an organic phosphite of the formula:

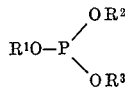

wherein $R^1$ is a member selected from the group consisting of hydrogen, the phenyl radical, 1–10 carbon atom alkyl substituted phenyl radicals, and alkyl radicals of 1–10 carbon atoms, $R^2$ and $R^3$ are selected from the group consisting of the phenyl radical, 1–10 carbon atoms substituted phenyl radicals, and alkyl radicals of 1–10 carbon atoms, said percentages based on the weight of said diisodecyl phthalate.

4. The wire coating composition of claim 3 in which the organic phosphite is triphenyl phosphite and in which the filler is a combination of clay and calcium carbonate.

References Cited

UNITED STATES PATENTS

| | | | |
|---|---|---|---|
| 2,675,366 | 4/1954 | Pullman | 260—45.95 |
| 2,919,259 | 12/1959 | Naylor et al. | 260—45.95 |
| 3,091,597 | 5/1963 | Henriques | 260—45.95 |
| 3,225,001 | 12/1965 | Darsa | 260—31.8 |
| 3,012,009 | 12/1961 | Martin | 117—128.4 |

FOREIGN PATENTS 1,149,359  5/1963  Germany.

OTHER REFERENCES

Penn: PVC Technology; MaClaren & Sons, Ltd.; 1962; pages 147–148.

Murfitt: Antioxidants for Stabilizing Plasticized P.V.C.; "British Plastics"; vol. 33; December 1960; pages 578–581.

MORRIS LIEBMAN, *Primary Examiner.*

L. T. JACOBS, *Assistant Examiner.*